United States Patent
Hainzlmaier et al.

(10) Patent No.: US 9,564,051 B2
(45) Date of Patent: Feb. 7, 2017

(54) METHOD FOR OPERATING A MOTOR VEHICLE, IN WHICH A USER IS WARNED OF HAZARDOUS SITUATIONS BASED ON DATA OBTAINED FROM OUTSIDE AND INSIDE THE VEHICLE, AND MOTOR VEHICLE OPERATED ACCORDINGLY

(71) Applicant: AUDI AG, Ingolstadt (DE)

(72) Inventors: Andre Hainzlmaier, Geisenfeld (DE); Roland Haberl, Ingolstadt (DE); Andreas Lamprecht, Ingolstadt (DE); Florian Netter, Ingolstadt (DE); Frank Oldewurtel, Ingolstadt (DE); Paul Sprickmann Kerkerinck, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/416,134

(22) PCT Filed: May 16, 2013

(86) PCT No.: PCT/EP2013/001449
§ 371 (c)(1),
(2) Date: Jan. 21, 2015

(87) PCT Pub. No.: WO2014/015922
PCT Pub. Date: Jan. 30, 2014

(65) Prior Publication Data
US 2015/0154864 A1  Jun. 4, 2015

(30) Foreign Application Priority Data
Jul. 21, 2012  (DE) .................. 10 2012 014 457

(51) Int. Cl.
*G08G 1/0967* (2006.01)
*G08G 1/0962* (2006.01)
(Continued)

(52) U.S. Cl.
CPC ............ *G08G 1/0967* (2013.01); *B60K 35/00* (2013.01); *G08G 1/0965* (2013.01);
(Continued)

(58) Field of Classification Search
CPC ............ G08G 1/0967; G08G 1/096716; G08G 1/096783; G08G 1/096855; G08G 1/096872
(Continued)

(56) References Cited

U.S. PATENT DOCUMENTS 6,012,012 A    1/2000  Fleck et al.
6,369,720 B1   4/2002  Wilhelm
(Continued)

FOREIGN PATENT DOCUMENTS

CN    2480241      3/2002
CN    101957205    1/2011
(Continued)

OTHER PUBLICATIONS

Chinese Office Action for related Chinese Patent Application No. 201380038813.3, issued Oct. 26, 2015, 7 pages.
(Continued)

*Primary Examiner* — Steven Lim
*Assistant Examiner* — Mancil Littlejohn, Jr.
(74) *Attorney, Agent, or Firm* — Staas & Halsey LLP

(57) ABSTRACT

In a method for operating a motor vehicle, data obtained from outside the motor vehicle, which indicate the existence of a hazardous situation, are transmitted to a receiving device. A warning concerning the hazardous situation is communicated to the user of the motor vehicle. In addition to the external vehicle data, data obtained from inside the vehicle, which indicate the existence of a hazardous situation, are evaluated. The warning is communicated to the user of the vehicle subject to the evaluation of the data obtained
(Continued)

from outside the vehicle and the data obtained from inside the vehicle.

19 Claims, 2 Drawing Sheets

(51) Int. Cl.
G08G 1/0965 (2006.01)
G08G 1/16 (2006.01)
B60K 35/00 (2006.01)

(52) U.S. Cl.
CPC ..... *G08G 1/09626* (2013.01); *G08G 1/09675* (2013.01); *G08G 1/096716* (2013.01); *G08G 1/096775* (2013.01); *G08G 1/096791* (2013.01); *G08G 1/162* (2013.01); *G08G 1/163* (2013.01)

(58) Field of Classification Search
USPC .......................................... 340/905
See application file for complete search history.

(56) References Cited

U.S. PATENT DOCUMENTS

| | | | |
|---|---|---|---|
| 6,577,943 | B2 | 6/2003 | Nakao et al. |
| 7,190,260 | B2* | 3/2007 | Rast ................ G08G 1/162 340/467 |
| 8,886,386 | B2 | 11/2014 | Merk |
| 2007/0013498 | A1* | 1/2007 | Knoll ............... B60R 16/0232 340/438 |
| 2008/0107037 | A1* | 5/2008 | Forbes .............. H04L 63/126 370/242 |
| 2012/0062375 | A1 | 3/2012 | Takeuchi et al. |
| 2012/0239253 | A1* | 9/2012 | Schmidt ............ B60T 7/22 701/41 |
| 2012/0280835 | A1* | 11/2012 | Raz .................. G08G 1/0112 340/905 |
| 2013/0038472 | A1* | 2/2013 | Gackstatter ........ B60W 30/0953 340/902 |
| 2013/0141251 | A1* | 6/2013 | Sims ................. B60Q 9/008 340/905 |

FOREIGN PATENT DOCUMENTS

| | | |
|---|---|---|
| CN | 102186693 A | 9/2011 |
| CN | 202345672 | 7/2012 |
| CN | 102632856 A | 8/2012 |
| DE | 3941402 | 6/1991 |
| DE | 4309606 | 9/1994 |
| DE | 19604084 | 10/1996 |
| DE | 10200002 | 8/2002 |
| DE | 102006057741 | 9/2007 |
| DE | 102006055344 | 5/2008 |
| DE | 102009028767 | 2/2011 |
| DE | 102012014457.1 | 7/2012 |
| EP | 0897168 | 2/1999 |
| EP | 0959442 | 11/1999 |
| EP | 1150266 | 10/2001 |
| WO | WO 03/081180 A3 | 10/2003 |
| WO | PCT/EP2013/001449 | 5/2013 |

OTHER PUBLICATIONS

German Office Action for German Priority Patent Application No. 10 2012 014 457.1, issued Jan. 7, 2013,6 pages.
English language International Search Report for PCT/EP2013/001449, mailed Sep. 16, 2013, 3 pages.
WIPO English Language Translation of the International Preliminary Report on Patentability for PCT/EP2013/001449, 8 pages, downloaded from WIPO website Jan. 21, 2015.
WIPO English Language Translation of the Written Opinion for PCT/EP2013/001449, 9 pages, downloaded from WIPO website Jan. 21, 2015.
Office Action issued on Jun. 23, 2016 in Chinese application No. 201380038813.3.
Office Action issued on Nov. 30, 2016 in Chinese application No. 201380038813.3.
Gao, Liang et al. "Modified Soul" Motorcycle, No. 2, Feb. 28, 2011, pp. 38-37. China.

* cited by examiner

METHOD FOR OPERATING A MOTOR VEHICLE, IN WHICH A USER IS WARNED OF HAZARDOUS SITUATIONS BASED ON DATA OBTAINED FROM OUTSIDE AND INSIDE THE VEHICLE, AND MOTOR VEHICLE OPERATED ACCORDINGLY

CROSS REFERENCE TO RELATED APPLICATIONS

This application is based on and hereby claims priority to International Application No. PCT/EP2013/001449 filed on May 16, 2013 and German Application No. 10 2012 014 457.1 filed on Jul. 21, 2012, the contents of which are hereby incorporated by reference.

BACKGROUND

The invention relates to a method for operating a motor vehicle, in which data which are obtained from outside the vehicle and indicate the presence of a hazardous situation are transmitted to a receiving device of the motor vehicle. A warning relating to the hazardous situation is communicated to a user of the motor vehicle. The invention also relates to a motor vehicle.

So-called car-to-car communication during which information and data are interchanged between motor vehicles is known from the related art. This is carried out, for instance, in order to be able to advise a driver of a hazardous situation in good time. For example, a motor vehicle which comes to a standstill at the end of a traffic jam can transmit corresponding information to further motor vehicles, with the result that drivers of these motor vehicles can likewise reduce the speed in good time before the end of the traffic jam can actually be seen.

The fact that nevertheless not all sources of hazards in road traffic are immediately clear to a user of the motor vehicle can be considered to be disadvantageous in this case. Furthermore, the currently present hazardous situation may be misjudged or else the driver's own capabilities in the road traffic can be overestimated.

SUMMARY

One possible object is to provide a method of the type mentioned at the outset and a motor vehicle suitable for carrying out this method, which enables improved warning of hazardous situations.

The inventors propose a method, in addition to the data obtained from outside the vehicle, data which are obtained from inside the vehicle and indicate the presence of a hazardous situation are evaluated. In this case, the warning is communicated to the user of the motor vehicle on the basis of the evaluation of the data obtained from outside the vehicle and the data obtained from inside the vehicle. As a result of the fact that the data obtained from inside the vehicle are taken into account in addition to the data obtained from outside the vehicle, the user of the motor vehicle is advised of the hazardous situation in a particularly targeted and individual manner. The user is therefore warned of the hazardous situation which is particularly relevant to him in real time. Transparency with respect to the real-time hazardous situation then prevails for the driver while driving, with the result that improved warning of hazardous situations is achieved.

This is based on the knowledge that the same external conditions, which may result in a situation being classified as a hazardous situation, may be more or less relevant on the basis of the driving situation of the motor vehicle whose receiving device receives the data obtained from outside the vehicle. Linking data obtained from inside the vehicle to the data obtained from outside the vehicle when determining the presence of the hazardous situation therefore makes it possible to warn the user of the motor vehicle in a manner particularly well adapted to the hazardous situation. The practice of individually warning the driver of the hazardous situations which are particularly relevant to him in real time on the basis of linked data implements a step toward the smart motor vehicle. It is therefore possible to avoid accidents, which generates both an individual benefit and a benefit for society as a whole.

Data relating to further motor vehicles are preferably evaluated as data obtained from outside the vehicle and are taken into account when determining the presence of the hazardous situation. In this case, it is possible to take into account real-time data, that is to say data which, at a time, are transmitted from only one further motor vehicle to the motor vehicle receiving the data obtained from outside the vehicle. However, the presence of the hazardous situation can be inferred in a particularly reliable manner when data which are obtained from outside the vehicle and relate to a multiplicity of further motor vehicles are evaluated. In this case, the data obtained from outside the vehicle may be collected over a particular interval of time, for example, and may be statistically evaluated.

This is because, if a multiplicity of further motor vehicles transmit similar data allowing conclusions of the hazardous situation, the conclusion actually drawn is particularly meaningful. The evaluation may be carried out, in particular, by the motor vehicle receiving the data obtained from outside the vehicle. However, additionally or alternatively, the data may be transmitted in a form which has already been statistically evaluated to the motor vehicle receiving the data obtained from outside the vehicle.

The data relating to further motor vehicles may comprise, in particular, a travel speed. In particular, this is because, if the travel speed of further motor vehicles is suddenly reduced from comparatively high values to comparatively low values, for example, this can be deemed to be an indication of the presence of a hazardous situation.

Additionally or alternatively, the further motor vehicles may transmit friction coefficients of a road surface. This is because, if weak friction coefficients are present, this is an indication of wet conditions and/or slippery conditions in the region of the further motor vehicles, which can then also become critical for the motor vehicle having the receiving device.

The intervention by a safety system in the journey of the further motor vehicles, for instance the activation of an electronic stability program or an anti-lock braking system, may also provide indications of the presence of a hazardous situation in an upcoming road section.

Furthermore, the actuation of a windshield wiper and/or a signal from a rain sensor may provide information indicating that there is precipitation and/or wet conditions which can adversely affect driving safety.

Similar conclusions can be drawn from the activation of a luminous device of at least one of the further motor vehicles, for instance when a fog light or a rear fog lamp is switched on. In this case, provision may be made, in particular, for the presence of precipitation or wet conditions to be inferred only when, in addition to the activation of the luminous device, at least one sensor, for instance a moisture sensor and/or a temperature sensor, of the motor vehicle provides a measured value corresponding to the foggy weather. This is based on the knowledge that the switching-on of a rear fog lamp, for instance, by a vehicle user is not necessarily associated with the actual presence of fog.

Further data which are obtained from outside the vehicle and relate to other motor vehicles may comprise a position of a sun visor and/or a signal from a device for detecting the position of the sun. This is because, in particular when the sun is low, the presence of a hazardous situation can be inferred on the basis of the associated blinding of the drivers of the further motor vehicles.

The presence of a rescue vehicle and/or an emergency vehicle can also be taken into account as data obtained from outside the vehicle when determining the presence of the hazardous situation. This is because the presence of rescue vehicles likewise allows the conclusion to be drawn that a hazardous situation is imminent. In this case, the rescue vehicles or emergency vehicles themselves can transmit the fact that they are present to the receiving device, or the further motor vehicles can be advised of the presence of rescue vehicles or emergency vehicles.

Alternatively, but preferably additionally, Internet data are evaluated as data obtained from outside the vehicle and are taken into account when determining the presence of the hazardous situation. For example, online data which indicate an accident frequency on a route may provide an indication of the fact that a particular hazardous situation can be assumed on this route. Online weather data can also be evaluated and can indicate the presence of a hazardous situation, for instance if precipitation suddenly starts or is imminent.

Data indicating the traffic flow can also be taken into account in Internet data in order to be able to infer the presence of a hazardous situation. If traffic jams can be frequently expected on particular routes, for example, such details can be provided online and can be evaluated and taken into account as Internet data.

Accident reports can also be provided online and can be evaluated, as can the presence of roadworks. Data which are then taken into account when determining the presence of the hazardous situation may be provided online, for example, in a roadworks database.

In particular, weather data, data indicating the traffic flow, accident reports or the presence of roadworks can also be transmitted via a radio data system in order to take these data obtained from outside the vehicle into account when determining the presence of the hazardous situation. Both the Internet data and the information provided via the radio data system can also be taken into account in order to be able to fall back on the respective other system in the event of failure or impairment.

The data obtained from inside the vehicle which are evaluated and are taken into account when determining the presence of the hazardous situation may comprise, in particular, a travel speed of the motor vehicle. This is because, at a high travel speed, the driving into the end of a traffic jam, for example, is more risky than at a low travel speed. In a similar manner, a distance between the motor vehicle and other road users can be taken into account in order to determine the presence of the hazardous situation. In this case, the distance from other motor vehicles in front of the motor vehicle is relevant, in particular.

The steering behavior of a driver of the motor vehicle can also allow conclusions to be drawn on the presence of a hazardous situation. This is because, if the driver frequently carries out correction movements on a steering handle or frequently carries out lane changes or overtaking maneuvers, this may likewise provide an indication of the fact that the driving into the end of a traffic jam, for example, is associated with an increased risk for this driver. This is in comparison with a driver who scarcely carries out steering movements or correction movements.

A cornering speed of the motor vehicle and/or a longitudinal acceleration and/or a lateral acceleration of the motor vehicle can also make the same situation outside the vehicle differently dangerous on an individual basis. This is because, in the case of a sporty driving style of the driver of the motor vehicle, which is distinguished by high cornering speeds and high longitudinal and lateral accelerations, the reaching of the end of a traffic jam, for example, is more risky than in the case of a defensive driving style of the driver.

Furthermore, a friction coefficient of a road surface and/or a condition of tires of the motor vehicle and/or a condition of a braking system of the motor vehicle can be taken into account as data obtained from inside the vehicle in order to communicate a warning adapted to the hazardous situation to the user of the motor vehicle. This is because, in the case of the same external conditions, these data obtained from inside the vehicle also have a different influence on the individual relevance, that is to say the relevance for the driver of the motor vehicle, of the hazardous situation.

In another advantageous refinement, those data from data obtained from inside the vehicle which relate to a driver of the motor vehicle are evaluated. These data relating to the driver of the motor vehicle are then taken into account when determining the presence of the hazardous situation. In this case, a response time and/or a fatigued state and/or the general level of attention of the driver is/are relevant, in particular. The latter information, in particular, can be determined using eye tracking, for example.

This is because said data relating to the driver likewise allow conclusions to be drawn as to what the actual hazardous situation is like for the individual driver. For example, a rested and more responsive driver can react more easily and quickly to a hazardous situation than an overtired driver.

It is also advantageous if the hazardous situation is classified on account of the evaluation of the data obtained from inside the vehicle and the data obtained from outside the vehicle and an intensity of the hazardous situation is communicated to the user of the motor vehicle. For example, a hazardous situation can be graded or classified as highly hazardous, hazardous or as a situation associated with a comparatively low risk. Graduation of the intensity of the hazardous situation is then expressed when accordingly generating the warning. The intensity of a warning signal indicating the hazardous situation can therefore be varied depending on the intensity of the hazardous situation.

In another advantageous refinement, the warning is communicated to the user of the motor vehicle in an optically and/or acoustically detectable manner. For example, a bar or the like which indicates the presence of the hazardous situation may be displayed on a display. This is because graduation according to the intensity of the hazardous situation can be carried out in a particularly simple manner in the case of a bar graph, in particular. However, a plurality of different discrete elements may also provide information relating to the intensity of the hazardous situation, for instance when more luminaires light up when there is a high risk than when there is a low risk. Warning tones can likewise be used, in which case the volume and/or the frequency with which the tones are output can provide an indication of the intensity of the hazardous situation.

The warning can be displayed to the user of the motor vehicle on an instrument panel of the motor vehicle. Additionally or alternatively, the warning can be communicated in a head-up display. In addition to a display on the instrument panel or in the head-up display, a warning tone can also advise the user of the presence of the hazardous situation. Optical and/or acoustic transmission makes it possible to ensure in a particularly effective manner that the user is advised of the presence of the hazardous situation in good time.

In another advantageous refinement, a driving behavior of the user of the motor vehicle is determined on the basis of the data obtained from inside the vehicle. In this case, the warning is communicated to the user on the basis of the driving behavior. For example, the analysis of the data obtained from inside the vehicle can indicate a sporty driving behavior of the user. If there is such a sporty driving behavior, a warning threshold can be increased, that is to say a threshold from which the warning relating to the hazardous situation is communicated to the user of the motor vehicle. The sporty driver is then not unnecessarily warned in situations which result in the warning being output for a less sporty driver. This avoids the driver feeling harassed by the warnings. For a sporty driver, the output of the warning can therefore also be completely prevented at least in some driving situations.

The driver can reveal, in particular by activating a sports mode of the motor vehicle and/or by another input, that the output of the warning should be prevented. This can also be learnt by the motor vehicle by the driver deactivating a warning which has been output and thus revealing that the output of the warning was not wanted by the driver. No warning message is then output in a subsequent, comparable situation.

In this case, the geographical position of the motor vehicle can be additionally or alternatively taken into account, in particular. This is because, if the motor vehicle is on a race track or a test track, for example, it can be assumed that high cornering speeds, longitudinal and lateral accelerations occur. In such a case, the output of warning messages relating to a hazardous situation is then not useful.

The individual driving behavior of the user can also be determined on the basis of the data obtained from inside the vehicle in order to accordingly take this into account when determining the presence of the hazardous situation. If it emerges, for example, that the user enters bends at a high speed relatively often, the user can be preventively warned of particularly hazardous bends. In this case, the evaluation of the user's driving behavior therefore results in the same data obtained from outside the vehicle and transmitted to the receiving device of the motor vehicle, namely the presence of a particular bend, being classified as a hazardous situation which is relevant to the specific driver. In contrast, in the case of a driver with a defensive driving behavior, the presence of the same bend cannot result in the warning being output or can result in a warning which indicates a hazardous situation of comparatively low intensity being output.

Finally, it has been found to be advantageous if the warning is changed on the basis of a response of the user of the motor vehicle. The warning may thus disappear when the user changes his driving behavior, with the result that the data obtained from inside the vehicle linked to the data obtained from outside the vehicle no longer indicate the presence of the hazardous situation or indicate the presence of the hazardous situation to a lesser extent.

The inventors also propose a motor vehicle that comprises a receiving device for receiving data which are obtained from outside the vehicle and indicate the presence of a hazardous situation. A warning device is provided for outputting a warning relating to the hazardous situation to a user of the motor vehicle. The motor vehicle also comprises an evaluation device which, in addition to the data obtained from outside the vehicle, can be used to evaluate data which are obtained from inside the vehicle and indicate the presence of a hazardous situation. In this case, the evaluation device is designed to control the warning device on the basis of the evaluation of the data obtained from outside the vehicle and the data obtained from inside the vehicle. As a result of the fact that the evaluation device takes into account both the data obtained from outside the vehicle and the data obtained from inside the vehicle, the user can be individually warned in a particularly effective manner on the basis of the hazardous situation actually present for the user.

The advantages and preferred embodiments described for the proposed method also apply to the proposed motor vehicle and vice versa.

The features and combinations of features mentioned above in the description and the features and combinations of features mentioned below in the description of the figures and/or shown in the figure alone cannot only be used in the respectively stated combination but can also be used in other combinations or alone without departing from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
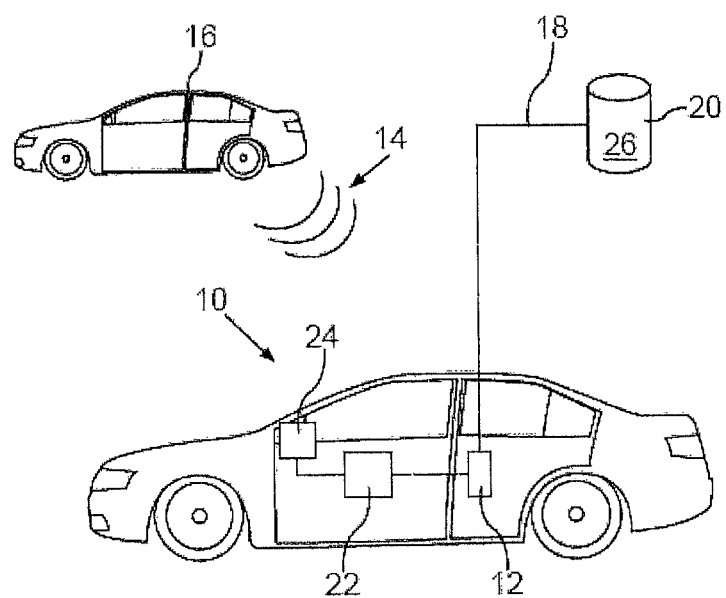
FIG. 1 schematically shows a motor vehicle which processes data obtained from inside the vehicle and data obtained from outside the vehicle in order to output a corresponding warning message to a driver of the vehicle in real time.
Figure 2:
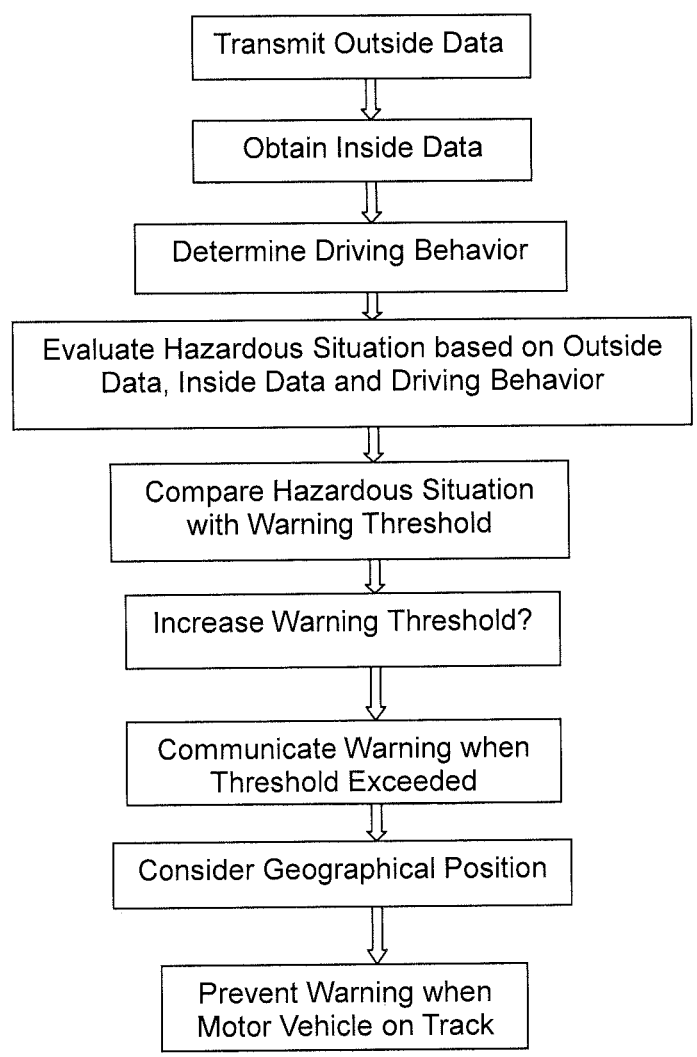
FIG. 2 is a flowchart showing one potential embodiment of the proposed method for operating a motor vehicle.

Reference will now be made in detail to the preferred embodiments of the present invention, examples of which are illustrated in the accompanying drawings, wherein like reference numerals refer to like elements throughout.

A motor vehicle 10 shown in the figure comprises a receiving device 12 for receiving data obtained from outside the vehicle. In the present case, said data obtained from outside the vehicle comprise data 14 which relate to further motor vehicles 16, only one such further motor vehicle 16 being illustrated in the figure for the sake of clarity. The receiving device 12 also receives, in data obtained from outside the vehicle, those data which can be retrieved via a connection 18 to the Internet, the figure showing, in a simplified manner, a database 20 containing such Internet data. The Internet data or online data 26, which can be transmitted to the motor vehicle 10 via the Internet connection 18, are schematically shown in the database 20 in the present case.

In addition to these data which are obtained from outside the vehicle and are obtained, on the one hand, from further motor vehicles 16 and, on the other hand, via the Internet connection 18, a control device 22 or a similar evaluation device evaluates data 25 obtained from inside the vehicle, that is to say data which relate to the motor vehicle 10 or to a driver of the motor vehicle 10. The linking of the data 14, 26 obtained from outside the vehicle and the data 25 obtained from inside the vehicle makes it possible to automatically calculate the current hazardous situation in real time and to communicate a corresponding warning message to the driver of the motor vehicle 10.

For this purpose, the control device 22 which is coupled to the receiving device 12 controls a display 24 which may be a head-up display, in particular. A warning tone is preferably additionally output.

The individual warning of a hazardous situation is therefore carried out in real time by linking the individual driver and vehicle data, that is to say the data 25 obtained from inside the vehicle, with the data 14 from the external motor vehicles 16 and the online data 26. In this case, the data obtained from outside the vehicle may be, in particular, aggregated data, that is to say data which have been provided or preprocessed by a host of the further motor vehicles 16. The driver is warned of hazardous situations by individually calculating the current hazardous situation in real time. In this case, the data from different levels or different origins are linked to one another.

Depending on the type of data obtained from outside the vehicle, different receiving devices may also be provided in the motor vehicle 10, which receiving devices then transmit the received data obtained from outside the vehicle to the control device 22 for evaluation.

Data relating to the speed, friction coefficients, driver attentiveness, a steering behavior, longitudinal accelerations and lateral accelerations of the motor vehicle 10, for example, can be collected in data 25 obtained from inside the vehicle.

The data 14 transmitted from the further motor vehicles 16 may comprise friction coefficients, speeds, signals from rain sensors, the activation of rear fog lamps or fog lights, the position of sun visors of the further motor vehicles 16 or the like.

The online data 26 available via the Internet connection 18 may comprise accident statistics, weather data, traffic data and the presence of roadworks.

Linking these data obtained from outside the vehicle and the data obtained from inside the vehicle thus makes it possible to calculate the instantaneous hazardous situation for the individual driver or the individual motor vehicle 10. For example, the further motor vehicles 16 may report low friction coefficients, as are present in wet and slippery conditions. Additionally or alternatively, the data 14 transmitted from the further motor vehicles 16 may state that certain safety systems, such as an electronic stability program or an anti-lock braking system, have intervened in the driving behavior of the further motor vehicles 16 on a particular route.

Furthermore, the database 20 accessible via the Internet connection 18 may comprise online data 26 in the form of online statistics which indicate a generally increased accident frequency precisely on the route currently being traveled on by the motor vehicle 10. An increased risk is then reported to the driver of the motor vehicle 10 acoustically and via the head-up display (or on the instrument panel). The reason for the increased risk can additionally be communicated.

However, the data 25 obtained from inside the vehicle are always also taken into account in this case, with the result that the driver of the motor vehicle 10 is adequately advised of a hazardous situation which is particularly relevant to the driver.

The evaluation of the data 14 which are obtained from outside the vehicle and relate to the further motor vehicles 16 and of the data 25 obtained from inside the vehicle can also be used for other purposes. If the individual warning of hazardous situations reveals that a particular driver gets into hazardous situations particularly often, this driver can be advised that it would be favorable for him to use a particularly safe vehicle in future. For example, it is possible to indicate to the driver in the motor vehicle or to communicate to him in another way, for instance by a dealer, that he should change from a motor vehicle with a front-wheel drive to a motor vehicle with a four-wheel drive.

In particular, data 25 relating to the individual driver of the motor vehicle 10 can be collected and an individual hazard profile can be created on the basis of these data 25. This hazard profile is then used again in the calculation of the real-time hazardous situation. If, for example, the individual driver of the motor vehicle 10 often enters bends particularly quickly, he can be already preventively warned of particularly hazardous bends.

In the present case, however, there is no active intervention in the journey of the motor vehicle 10, but rather only the driver of the motor vehicle 10 is advised in real time of the presence of a hazardous situation which is particularly relevant to the driver. This makes it possible to reduce accidents.

The current hazardous situation can be indicated, in particular, by a visual display on the instrument panel or in the head-up display, in which case the intensity of the hazardous situation can be reflected in a graduation of the display. For example, the blending of a bar into the head-up display can indicate the presence of the hazardous situation, in which case the length of the bar provides information on the intensity of the hazardous situation. If the driving behavior of the driver of the motor vehicle 10 changes in such a case, for instance by virtue of the driver reducing the speed, the length of the bar indicating the hazard is also reduced. The display therefore changes in real time on the basis of the current driver's reaction.

Furthermore, the warnings are preferably intelligently filtered by taking into account, for example in the case of a driver of the motor vehicle 10 in which high longitudinal and lateral accelerations often occur, the driver's sporty driving style when outputting the warning message which indicates the hazardous situation. It is thus possible to prevent a sporty driver of the motor vehicle 10 being harassed by continuous hazard warnings.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a motor vehicle, comprising:
   transmitting outside data obtained from outside the motor vehicle to a receiving device of the motor vehicle, the outside data indicating presence of a hazardous situation;

obtaining inside data from inside the motor vehicle, the inside data also indicating presence of the hazardous situation;

determining a driving behavior of a user of the motor vehicle based on the inside data;

evaluating the hazardous situation based on the outside data, the inside data and the driving behavior of the user of the motor vehicle;

comparing the hazardous situation with a warning threshold;

increasing the warning threshold when there is a sporty driving behavior by the user of the motor vehicle;

when the hazardous situation exceeds the warning threshold, communicating a warning relating to the hazardous situation to the user of the motor vehicle;

considering a geographical position of the motor vehicle and whether the motor vehicle is on a race track or a test track; and preventing the warning from being output when the motor vehicle is on the race track or the test track.

2. The method as claimed in claim 1, wherein
the outside data is data relating to a further vehicle, and
the outside data comprises information regarding at least one of:
a travel speed of the further vehicle,
a friction coefficient of a road surface determined by the further vehicle,
intervention by a safety system of the further vehicle,
actuation of a windshield wiper in the further vehicle and/or production of a signal from a rain sensor in the further vehicle,
activation of a luminous device in the further vehicle,
a position of a sun visor in the further vehicle and/or production of a sun position signal from a device in the further vehicle, and
presence of a rescue vehicle and/or an emergency vehicle.

3. The method as claimed in claim 2, wherein the outside data is received from a plurality of further vehicles, to provide information regarding conditions at the plurality of further vehicles.

4. The method as claimed in claim 2, wherein
the outside data is data relating to a plurality of further vehicles, and
the outside data is statistically evaluated such that a reliability factor is increased when similar data is received from more than one further vehicle.

5. The method as claimed in claim 1, wherein
the outside data comprises Internet data and/or radio information transmitted to the motor vehicle via a radio data system, and
the internet data and/or the radio information comprises at least one of:
data indicating an accident frequency,
weather data,
data indicating a traffic flow,
accident reports, and
presence of roadwork.

6. The method as claimed in claim 1, wherein the inside data comprises information regarding at least one of:
a travel speed of the motor vehicle,
a distance between the motor vehicle and other road users,
a steering behavior of a driver of the motor vehicle,
a cornering speed of the motor vehicle,
a longitudinal acceleration and/or a lateral acceleration of the motor vehicle,
a friction coefficient of a road surface as determined by the motor vehicle, and
a condition of tires and/or a braking system of the motor vehicle.

7. The method as claimed in claim 1, wherein
the inside data comprises information relating to the user of the motor vehicle, and
the information relating to the user of the motor vehicle comprises at least one of:
a response time of the user of the motor vehicle,
a fatigued state of the user of the motor vehicle, and
a level of attention of the user of the motor vehicle.

8. The method as claimed in claim 1, wherein
the hazardous situation is classified based on evaluation of the outside data and the inside data, and
the warning communicates an intensity of the hazardous situation to the user of the motor vehicle.

9. The method as claimed in claim 1, wherein the warning relating to the hazardous situation is optically and/or acoustically communicated to the user of the motor vehicle.

10. The method as claimed in claim 1, wherein
the warning relating to the hazardous situation is optically communicated to the user of the motor vehicle, on at least one of an instrument panel of the motor vehicle and in a head-up display.

11. The method as claimed in claim 1, wherein
the warning relating to the hazardous situation is output as first and second warning items,
a response of the user of the motor vehicle to the first warning item is evaluated, and
the first warning item is changed to produce the second warning item based on the response of the user of the motor vehicle.

12. The method as claimed in claim 11, wherein if the response of the user of the motor vehicle is to deactivate the warning relating to the hazardous situation, then the sporting driving behavior is inferred.

13. The method as claimed in claim 1, wherein
the outside data is data received from and relates to a further vehicle, and
the outside data indicates presence of the hazardous situation by indicating at least one of:
a travel speed of the further vehicle suddenly decreasing,
a friction coefficient relating to slippery conditions,
an anti-lock braking system being activated in the further vehicle,
windshield wipers being been activated in the further vehicle, and
fog lights being activated in the further vehicle.

14. The method as claimed in claim 1, wherein
the outside data indicates an upcoming traffic jam,
the inside data indicates a travel speed of the motor vehicle, and
the warning threshold is decreased with increased travel speed of the motor vehicle.

15. The method as claimed in claim 1, wherein a sporting driving behavior is determined when the inside data indicates activation of a sports mode in the motor vehicle.

16. The method as claimed in claim 1, wherein
the driving behavior of the user of the motor vehicle indicates a previous speed at which the user of the motor vehicle has entered curves,
the outside data includes curve information indicating an upcoming curve, and the hazardous situation is evaluated by comparing the curve information with the previous speed at which the user of the motor vehicle has entered curves.

17. The method as claimed in claim 1, wherein individual warnings relating to hazardous situations are collected to determine a hazard profile for the user of the motor vehicle.

18. The method as claimed in claim 17, wherein
the outside data indicates upcoming road hazards, and
the hazardous situation is evaluated by comparing the upcoming road hazards with the hazard profile for the user of the motor vehicle.

19. A motor vehicle comprising:
a receiving device to receive outside data obtained from outside the motor vehicle, the outside data indicating presence of a hazardous situation;
a warning device to output a warning to a user of the motor vehicle; and
an evaluation device to:
receive inside data obtained from inside the motor vehicle, the inside data also indicating presence of the hazardous situation
determine a driving behavior of the user of the motor vehicle based on the inside data;
evaluate the hazardous situation based on the outside data, the inside data and the driving behavior of the user of the motor vehicle;
compare the hazardous situation with a warning threshold;
increase the warning threshold when there is a sporty driving behavior by the user of the motor vehicle;
when the hazardous situation exceeds the warning threshold, to control the warning device to cause the warning device to output a warning relating to the hazardous situation to the user of the motor vehicle;
consider a geographical position of the motor vehicle and whether the motor vehicle is on a race track or a test track; and
prevent the warning relating to the hazardous situation when the motor vehicle is on the race track or the test track.

* * * * *